May 13, 1958 G. C. HARTLEY 2,834,836
STATIC ELECTRICAL CODE TRANSLATING APPARATUS
Filed Jan. 10, 1955 5 Sheets-Sheet 1
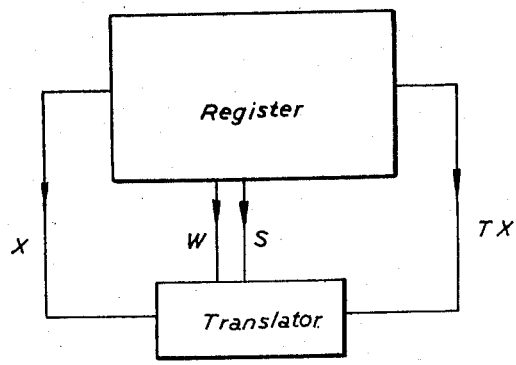
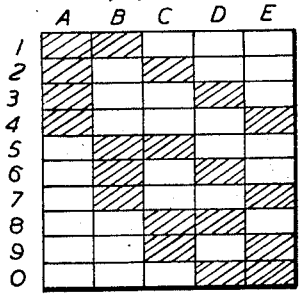
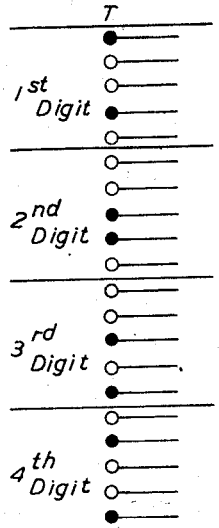
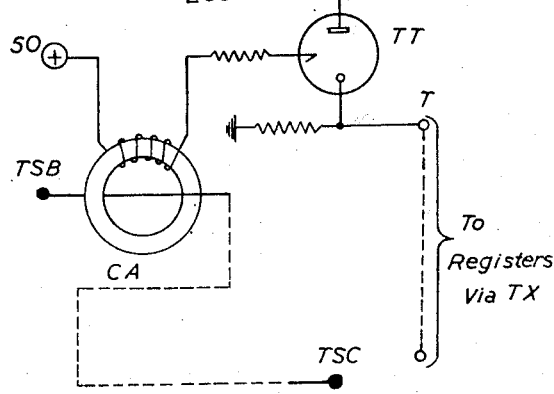
Inventor
G. C. HARTLEY
By Robert Harding Jr.
Attorney

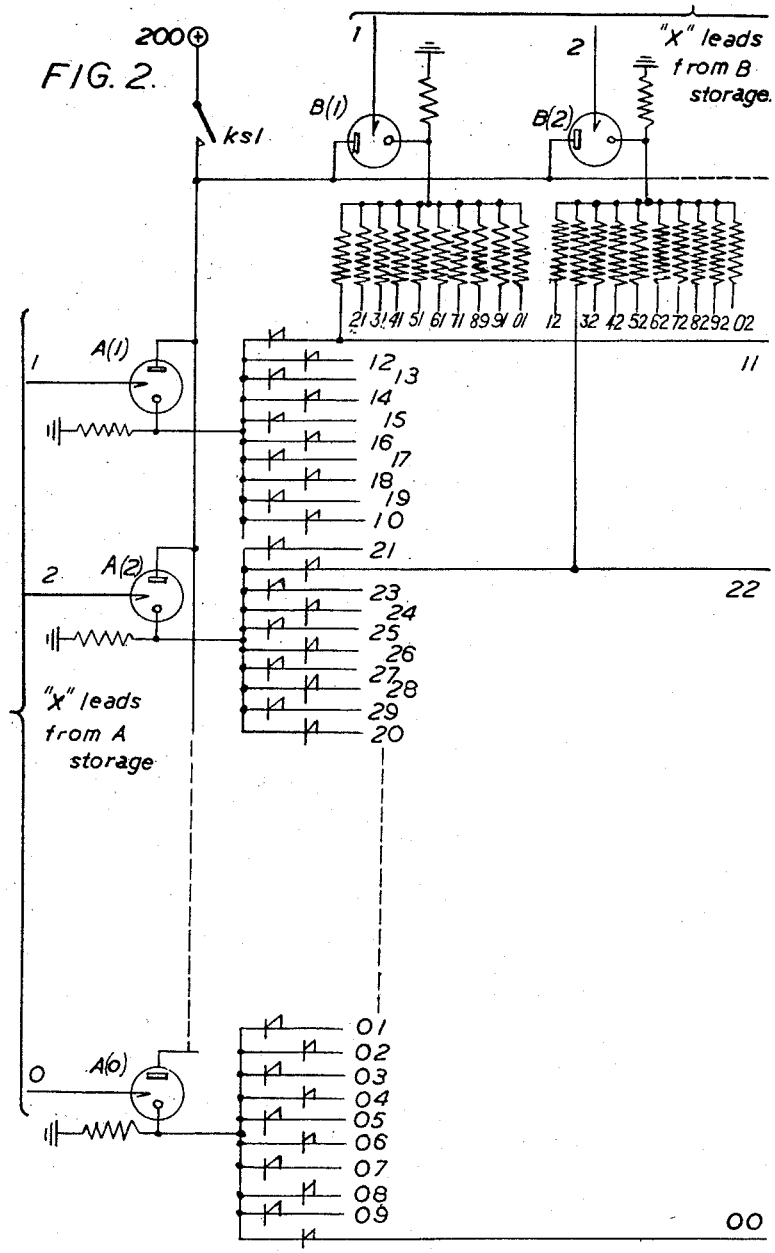

May 13, 1958  G. C. HARTLEY  2,834,836
STATIC ELECTRICAL CODE TRANSLATING APPARATUS
Filed Jan. 10, 1955  5 Sheets-Sheet 3

Inventor
G. C. HARTLEY
By Robert Harding Jr
Attorney

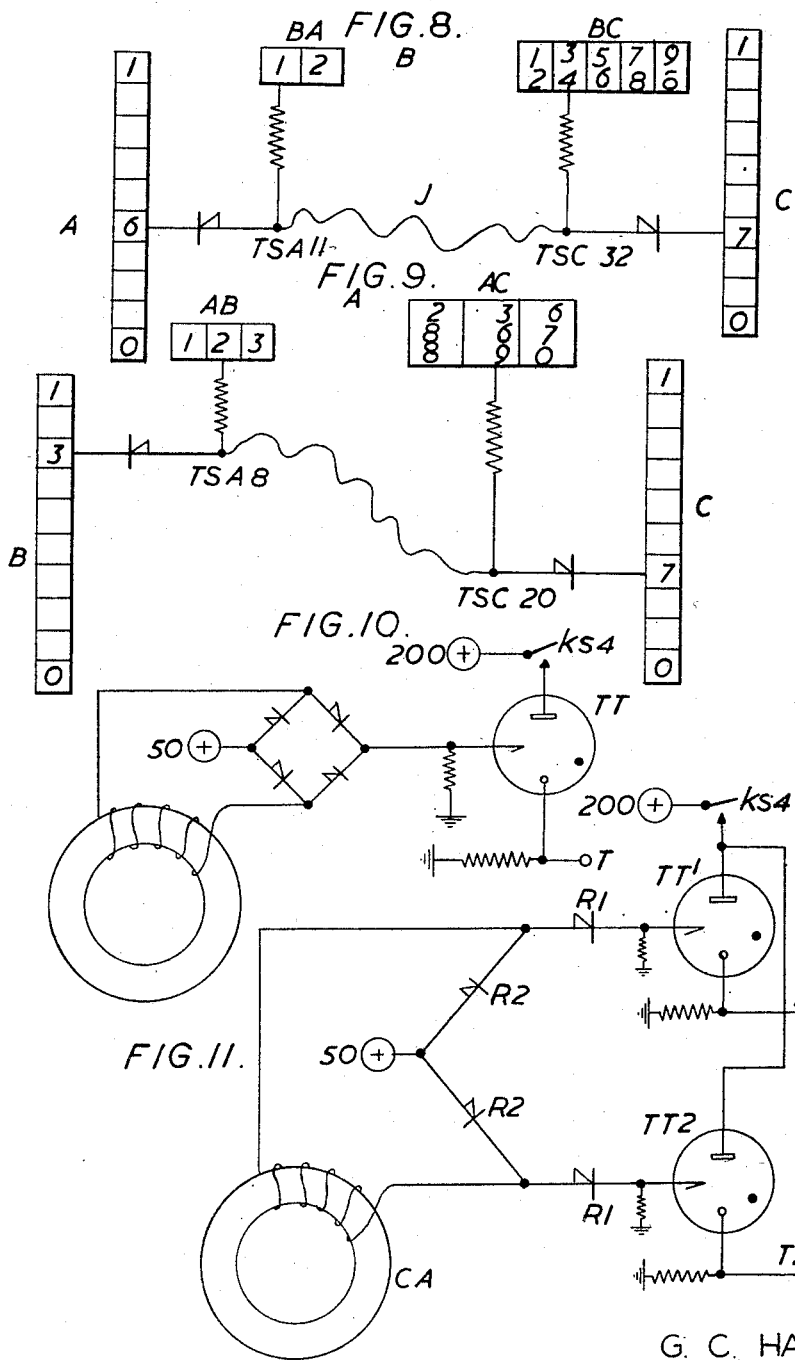

United States Patent Office 2,834,836
Patented May 13, 1958

2,834,836

STATIC ELECTRICAL CODE TRANSLATING APPARATUS

George Clifford Hartley, London, England, assignor to International Standard Electric Corporation, New York, N. Y., a corporation of Delaware Application January 10, 1955, Serial No. 480,965

Claims priority, application Great Britain January 13, 1954

9 Claims. (Cl. 179—18)

This invention relates to electric code translators, and is particularly but not exclusively applicable to register translators for use in telephone systems and the like.

Some schemes hitherto used employ electronic translation means common to a plurality of electronic registers in which what is known as a "route tube" is provided for each translation which the translator is capable of providing. Thus, in a telephone system, digits requiring translation, such for instance as the letters or exchange code in a metropolitan area, are received by a register and in due course passed to a common translator where the digits comprising the code are stored in decade form and combined by means of well known rectifier gating arrangements to select a point or terminal corresponding to the code requiring translation, there being a different point for each possible code. A potential appearing at such a point means that a particular translation is required, and while, theoretically, this potential could be analysed by a further rectifier network to produce the required translation information, it is found in practice that the power available is insufficient and that some form of amplification is desirable. One suitable form of amplifier is a gas filled tube. Thus, one such tube, generally termed a "route tube" is provided for each translation point, together with a number of rectifier elements and fairly elaborate strapping facilities to enable translations to be arranged and altered when required. Such an arrangement may be both bulky and expensive.

Other known forms of translator employ the technique of threading wires, one for each translation, through a number of annular magnetic cores fitted with secondary windings and deriving a translation by injecting a high power pulse into the appropriate wire and picking up the translated intelligence from the pulses derived from the secondary windings of the coils through which the wire passes. One disadvantage of such an arrangement is that the instantaneous current through the threaded wire is high and has hitherto been difficult to obtain without recourse to mechanical contacting devices which are undesirable in this type of equipment.

Another disadvantage is that, the sense of the voltage produced in the secondary windings being dependent upon the sense of the current in the primary winding, it is necessary to thread all jumpers in the same direction through the various coils or to provide two secondary windings to each coil if it is desired to make use of threading in both directions. Such provision is difficult on account of the size of the coils.

One feature of the invention is the provision of static electrical code translating apparatus which comprises a plurality of toroidal cores. A wire for each translation to be effected is threaded through a suitable combination of the cores from a first terminal of a first plurality of terminals to a second terminal of a second plurality of terminals. Voltages are set up in secondary windings of said suitable combination of cores when current is passed through the appropriate wire. A code to be translated is divided into two parts which respectively and simultaneously determine the selection of said first and second terminals and cause changes of potential to appear thereat. The terminals of at least one of said two pluralities of terminals are the coordinate points formed by one terminal from each of a plurality of static electrical devices arranged in coordinate array and to the control circuits of which signals denoting one part of a code to be translated are applied.

Another feature of the invention is the provision of static electrical code translating apparatus which comprises a number of wires each of which forms primary windings connected in series of a predetermined selection of a number of transformers and which comprises means for applying the resultant voltage induced in a secondary winding of a transformer to a corresponding terminal as a potential of predetermined polarity irrespective of the direction of flow of current in the primary winding of that transformer.

A further feature of the invention consists in static electrical code translating apparatus comprising a plurality of magnetic, toroidal cores in which a conductor or jumper for each code to be translated is threaded through a combination of the magnetic cores. Each core has a secondary or output winding in which a voltage is generated when a surge of current occurs in a jumper passing therethrough. The ends of a secondary winding are connected to the control circuits of two static electrical switches through a rectifier network so arranged that one switch operates when the voltage generated in the secondary winding is in one sense and the other switch operates when the voltage generated in the secondary winding is in the opposite sense.

The invention will now be described with reference to the accompanying drawings in which:

Fig. 1 is a block schematic showing a translator connected to one of a plurality of registers;

Figs. 2, 3, 4 placed side by side with Fig. 2 on the left and Fig. 4 on the right is a circuit schematic diagram of a translator;

Fig. 5 shows how coils shown in Fig. 4 are connected to produce pulses;

Fig. 6 is a table showing a "two out of five" code;

Fig. 7 shows a row of terminals having a pulse pattern thereon;

Fig. 8 shows another arrangement for combining code digits;

Fig. 9 shows a further arrangement for combining digits;

Fig. 10 shows another method of connecting the coils shown in Fig. 4 to produce pulses, and Fig. 11 shows a further method of connecting the coils to produce either of two pulses.

Referring first to Fig. 1, a register requiring the services of the translator seizes the translator when free over one or more leads W in known manner and operates a relay KS in the translator over a lead S. The operation of relay KS will be described in connection with Figs. 2, 3 and 4. Having associated itself with the translator, the register transfers to the translator the three code digits A, B and C over a number of leads X. The translator operates in a manner which will be described and sends back to the register a pattern of pulses over a number of leads TX, the pattern of pulses, as will be described, denoting the translation required by the register. The register then releases the translator by releasing the relay KS, whereupon the translator restores to normal and is available for use by another register. It will be appreciated that since only one register can use the translator at any one time, all the leads X, W, S and TX may be multipled to all the registers.

Figure 3:
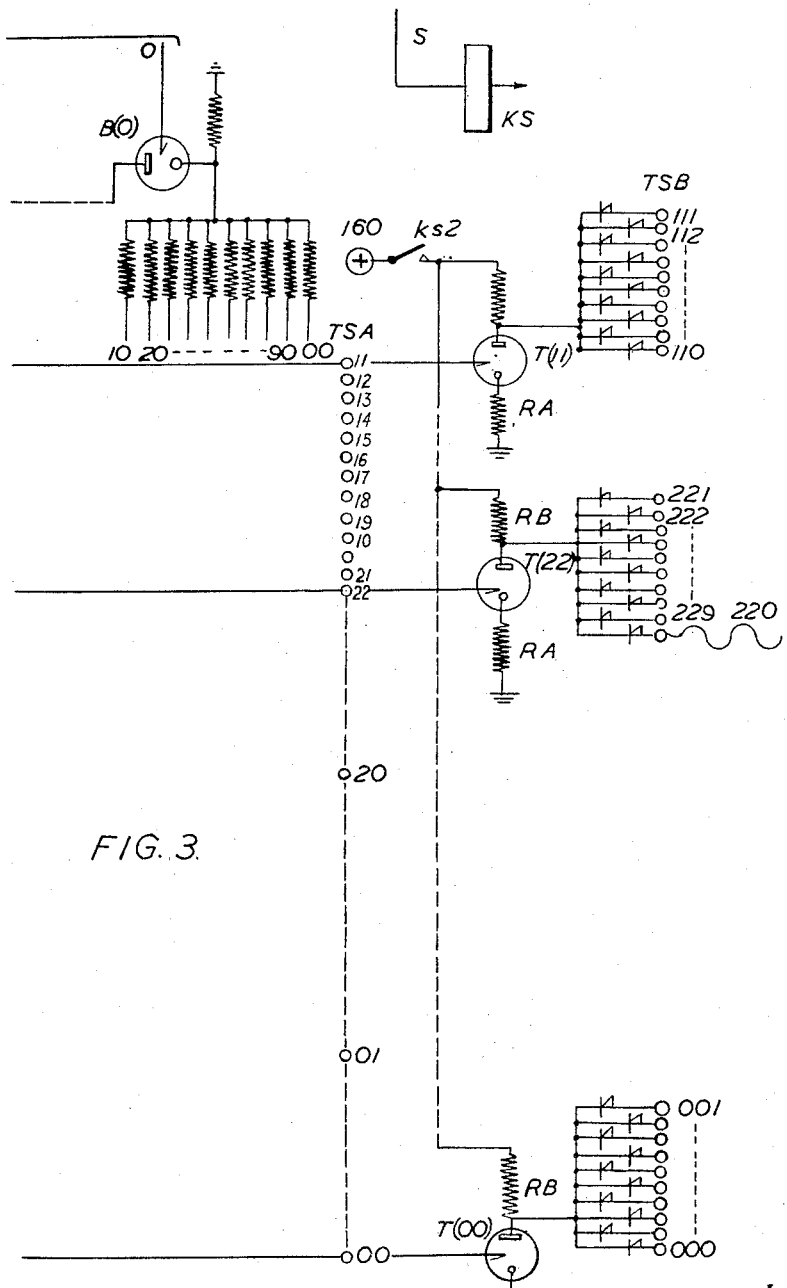
Figure 4:
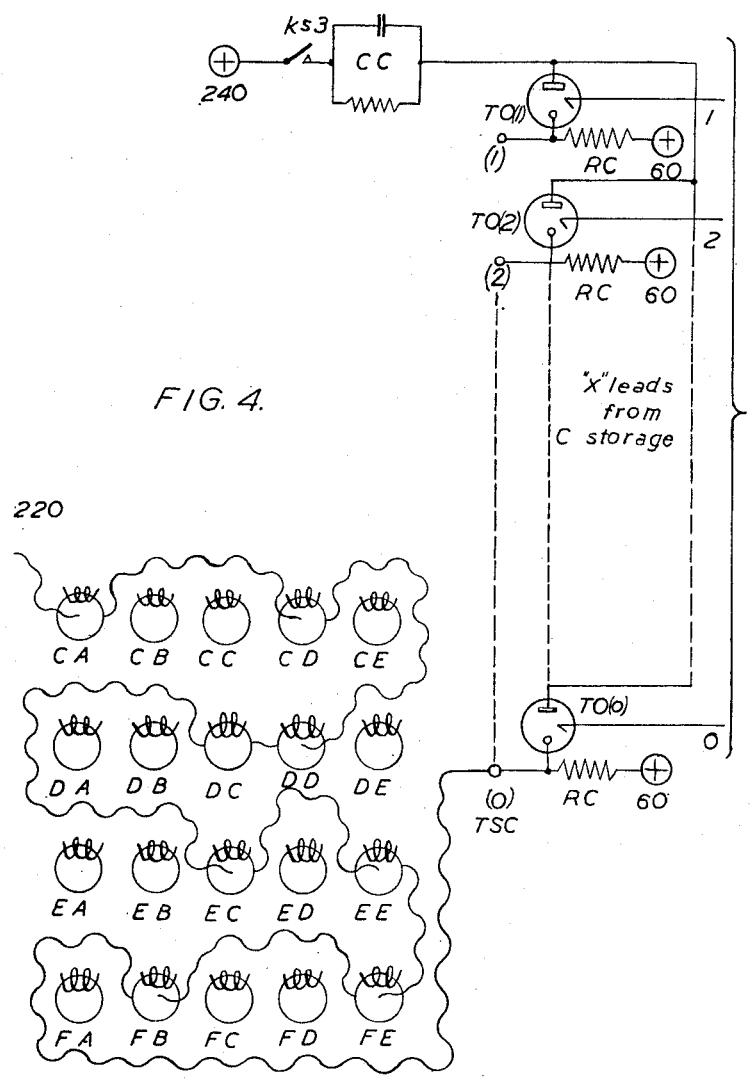

Turning now to Figs. 2, 3 and 4, the operation of the translator will be described assuming that code 220 (e. g. the code for Acorn Exchange in the London Telephone System) is to be translated into routing digits 3897.

When the register has received the whole of the code 220 it seizes the translator in known manner when free and over lead S operates relay KS (Fig. 3). Relay KS closes its contacts ks1 (Fig. 2), ks2 (Fig. 3), ks3 (Fig. 4), and ks4 (Fig. 5) to apply various anode voltages to the gas tubes in obvious manner. The register also applies a suitable voltage to lead 2 of the X leads from its A storage group, lead 2 of the X leads from its B storage group and lead 0 of the X leads from its C storage group. The X leads from the A storage group each terminate at the trigger electrode of cold cathode gas storage tubes A(1) . . . A(0) and likewise the X leads from the B storage group each terminate at the trigger electrode of cold cathode gas gap storage tubes B(1) . . . B(0). The cathodes of the tubes in the A and B storage tubes are connected via rectifier gates to 100 terminals TSA such that the cathode of A(1) is connected to TSA11 . . . 10, A(2) to TSA21 . . . 20 and so on, while the cathode of B(1) is connected to TSA11, 21, 31 . . . 01, B(2) to TSA12, 22, 32 . . . 02, and so on, so that each possible AB combination is made. Thus when tubes A(2) and B(2) are primed from the register they fire and a positive potential is fed to terminal TSA22 and a tube T22 fires. Tube T22 is one of a 100 tubes T(11) . . . T(00) each having an individual low impedance cathode connection RA to earth and a high impedance anode connection RB to positive potential, say 160 volts. The trigger electrodes of the tubes are connected to the TSA terminals in obvious manner.

The X leads from the C storage group of the register each terminate at the trigger electrode of storage tubes TO(1) . . . TO(0) (Fig. 4). Each of these tubes has an individual high impedance cathode connection RC to, say, a positive potential of 60 volts and a common low impedance anode connection CC, advantageously consisting of a condenser and resistance in parallel, to a positive potential of say 240 volts. Tube TO(0) being primed from the register, fires.

Returning now to the hundred tubes T(11) . . . T(00), it will be seen that the anode of each tube is connected through individual rectifiers to each of ten terminals TSB in regular order, the anode of T(11) being connected to TSB111, 112, 113 . . . 110 and the anode of T(12) being connected to TSB121, 122, 123 . . . 120, and so on, so that there are 1000 TSB terminals, each group of 10 being representative of a different AB code combination. Terminals TSB and TSC are interconnected by means of 1000 jumper wires, one from each TSB terminal, the other end going to the appropriate TSC terminal bearing a number the same as the last digit of the TSB terminal. Thus, the jumper wire from TSB111 goes to TSC1, from TSB112 to TSC2, from 221 to TSC1 and so on.

Considering now terminal TSB220 which is connected to TSC0, the firing of TO(0) to which TSC0 is connected and the firing of T(22) to which TSB220 is connected causes a heavy current surge over the path +240, contacts ks3, low impedance CC, tube TO(0), terminal TSC(0), jumper 220, terminal TSB220, rectifier to anode of T(22), tube T(22), low impedance cathode RA of T(22) to earth. None of the other 999 jumper wires carry any appreciable current since in every case one or other or both ends have a high impedance resistance in circuit.

In order to obtain translation the jumper wires are threaded through a number of annular magnetic cores fitted with secondary windings. The connections for one such core is shown in Fig. 5.

The secondary winding on a core CA is connected between a priming voltage and the trigger electrode of a tube TT having a suitable cathode load. Current through the jumper from TSC to TSB causes the tube TT to fire and a potential appears at a terminal T. Twenty such cores CA and tubes TT are provided, arranged as shown in Fig. 4 to give four groups of 5 each. There are thus 20 terminals T and by suitably threading the jumpers through the cores, each jumper may be arranged to produce a different pattern of pulses on the terminals T which are connected to the register via leads TX. It is assumed that up to four digit translation is required and that for each digit a pattern of "2 out of 5" is to be used.

Fig. 6 shows a suitable code in which, if the five pulse positions are regarded as A, B, C, D, E, then 1 is denoted by AB, 2 by AC and so on. Jumper wire 220 (Fig. 4) being shown threaded through CA and CD from the first digit produces pulses in positions A and D which on reference to Fig. 6 denotes the digit 3. In like manner for the second digit the jumper 220 passes through cores DC and DD denoting the digit 8. If the twenty T terminals are listed in a row as shown in Fig. 7, it will be seen that the jumper 220 has been threaded through such cores as produce a pattern of pulses denoting 3897. In like manner all other jumpers are threaded through appropriate cores according to the translation required therefrom.

When the register has received and recorded the pattern of pulses in any suitable manner it releases relay KS in the translator and the respective tubes deionise, restoring the translator to normal, ready for another register. It will be obvious that the cores CA–FE (Fig. 4) may be arranged in any suitable manner and may consist of more or less cores as required.

Various modifications may be made to the arrangement already described. For example, the X leads from the C storage group of the registers may terminate in a set of tubes similar to A(1) . . . A(0) and these may in turn be arranged to operate the tubes TO(1) . . . TO(0).

Again, while the A and B digits have been combined to fire the appropriate tube T(11) . . . T(00) the digits A and C or B and C may be so combined instead. Translations requiring less than four digits may be obtained by omitting the appropriate line or lines of cores from the appropriate jumper or jumpers. Thus, for a three digit translation the jumper will not be threaded through any of the cores FA . . . FE.

In the arrangement already described, the A and B digits have been combined in coordinate manner through their respective storage tubes to provide 100 terminals TSA.

These in turn have been combined in coordinate manner with the C digit through their storage tubes and through individual decoupling rectifiers to provide 1000 jumpers at jumper connecting terminals. However, such an arrangement may be varied in any desired manner.

For instance, as shown in Fig. 8, one of the digits, in this instance the B digit, may be signalled to the translator from the register as two signals, one denoting one out of five and the other denoting odd or even. The odd or even signals may be received on the appropriate BA tube and combined with the A digit to produce 20 TSA terminals. The first of these terminals would denote all codes starting with 11 or 13 or 15 or 17 or 19 and the second terminal would denote all codes starting with 12 or 14 or 16 or 18 or 10. Similarly with the remaining eighteen terminals. In like manner the "one out of five" signal may be received on the appropriate BC tube and combined with the C digit to produce 50 TSC terminals. The first of these terminals would denote all codes ending with 11 or 21, the second would denote all codes ending with 31 or 41 and so on.

In the example shown in Fig. 8, the code has been presumed to be 637. Hence in the A series of tubes, 106 is connected to the odd or 101 tube in the BA group, thereby going to terminal TSA11 which denotes all codes starting with 61 or 63 or 65 or 67 or 69. On the other hand 107 tube in the C series is connected to the second or "3, 4" tube in the BC group, thereby going to terminal TSC32 which denotes all codes ending with 37 or 47. The jumper 3 is then connected, in the manner already described, between TSA11 and TSC32 for the code 637.

It will be noticed that the number of TSA terminals multiplied by the number of TSC terminals is equal to the number of codes and consequently the economy in apparatus will be greatest when the numbers of TSA and TSC terminals are as equal as possible. For instance, where 900 codes are involved, the A digit being the one which is restricted, e. g. codes 211 to 000, where 0 comes after 9, as in normal telephone dialing practice, the A digits may be divided, as shown in Fig. 9, into a signal to group AB, which consists of one of 3 possibilities and is combined with the B digit to give 30 TSA terminals, and into a signal to group AC which also consists of a group of 3, each catering for three A digit numbers, which is combined with the C digit to give 30 TSC terminals.

The first TSA terminal denotes all codes starting with 21 or 31 or 41, the second TSA terminal denotes all codes starting with 51 or 61 or 71, and so on, while the first TSC terminal denotes all codes 2B1 or 5B1 or 8B1, the second all codes 3B1 or 6B1 or 9B1, and so on; B denotes any B digit. In the example shown, code 637 involves connecting AB2 to B3 to produce terminal TSA8, denoting all codes starting with 33 or 63 or 93, and connecting AC5, 6, 7, to C7 to produce terminal TSC20, denoting all codes 3B7 or 6B7 or 9B7. The jumper J between TSA8 and TSC20 denotes code 637.

In Fig. 5 the secondary winding is shown connected to the trigger electrode of tube TT, and in order that the surge of current in the jumper shall produce a primary voltage, the jumper must be threaded through the core CA in the correct direction, having regard to the direction in which the current in the jumper flows. By interposing a full wave rectifier between the secondary winding and the trigger electrode, as shown in Fig. 10, the potential applied to the trigger electrode may be arranged to be always of a predetermined polarity, irrespective of the direction of flow of current in the jumper, that is to say, irrespective of the direction in which the jumper is threaded through the core CA.

In Fig. 4 groups of 5 cores each have been shown, producing a digit pattern of "2 out of 5" on the outgoing wires. Other patterns and other quantities of cores in a group may be used if desired.

Fig. 11 shows an arrangement in which eighteen codes of "2 out of 8" pattern may be obtained using only 4 cores in a group. In this arrangement each end of the secondary winding on core CA is taken to the trigger electrode of a different tube, e. g. TT1 and TT2. A bridge rectifier of the type shown in Fig. 10 is opened out to include the trigger electrodes so that each end of the winding is connected to its trigger electrode through a rectifier R1, and to a suitable source of potential through a rectifier R2. The source of voltage, together with the voltage produced in the secondary winding, which is dependent upon the direction of current surge in the jumper, causes firing of either TT1 or TT2. The direction of current surge in the jumper at each core will be determined by the direction in which the jumper is threaded through the core CA, assuming that the more positive of the voltages applied to the jumper is always applied at a predetermined end of the jumper. In practice is is found convenient to go "down" one core and "up" another and it will be found that this arrangement may be used with twelve of the eighteen possible codes which for decimal working is sufficient.

What I claim is:

1. Static electrical code translating apparatus comprising a plurality of static electric switching devices arranged in a coordinate array and having control circuits therefor, means responsive to a signal denoting one part of a code to be translated for applying an operating voltage to one of said control circuits to render the switching device thereof conductive, a first plurality of terminals, a second plurality of terminals, the terminals of said first plurality of terminals being connected respectively to said switches, a plurality of toroidal cores, each of said cores having a secondary winding, a plurality of jumper wires there being one for each translation to be made, each of said wires being threaded through a different combination of said cores from one terminal of said first plurality of terminals to one terminal of said second plurality of terminals, the combination of said first and second terminals representing the number to be translated and the combination of cores through which the jumper wire connecting said combination of terminals is threaded representing the translated number, means responsive to a signal denoting the other part of a code to be translated for applying a potential to one of the terminals of said second plurality of terminals sufficient to cause a surge of current through one of said jumper wires connected to a terminal of said first plurality which is in turn connected to a static electric switching device which has been rendered conductive, and means for utilizing the voltage developed in the secondary windings of toroidal cores traversed by said jumper wire for indicating the translated number.

2. Static electrical code translating apparatus comprising a plurality of transformers each having a secondary winding, a plurality of wires each of which forms series-connected primary windings of a different combination of said transformers, a plurality of terminals, there being one for each transformer secondary winding, and means for connecting each secondary winding to its corresponding terminal, said means including means responsive to a voltage developed across said secondary winding for applying a potential of a predetermined polarity to said terminal irrespective of the polarity developed voltage across said secondary winding.

3. Static electrical code translating apparatus comprising a plurality of toroidal cores each having a secondary winding, a plurality of jumper conductors, there being one for each code to be translated, each of said jumper conductors being threaded through a different combination of said cores to form primary windings therefor, a pair of static electrical switches for each core, each switch having a control circuit, the ends of the secondary winding of said core being connected respectively to said control circuits, and a rectifier network connected across the ends of said secondary winding for causing one switch to operate when the voltage generated in said secondary winding is in one sense and the other switch to operate when the voltage generated in said secondary winding is in the opposite sense.

4. Static electrical code translating apparatus, as claimed in claim 1, in which the means responsive to a signal denoting the other part of a code to be translated for applying a potential to one of the terminals of the second plurality of terminals comprises a plurality of static electrical devices each being connected to a different one of said terminals, a source of potential connected to all said devices, and means for operating a selected one of said devices to cause said device to become conductive whereby said source of potential is applied to the associated terminal.

5. Static electrical code translating apparatus, as claimed in claim 4, in which the means for utilizing the voltage developed in the secondary windings comprises a plurality of static electrical switches each having a control circuit, there being one switch for each secondary winding, and a rectifier network between the ends of each secondary winding and the control circuit of the associated switch for maintaining the sense of the potential applied to the control circuit independent of the direction of threading of the jumper wires through the cores.

6. Static electrical code translating apparatus, as claimed in claim 4, in which the means for utilizing the voltage developed in the secondary windings comprises a plurality of static electrical switches, each having a control circuit, there being two switches for each secondary winding having their control circuits connected to the ends of said winding, and a rectifier network interposed between the ends of said winding and said control circuits for causing the polarity of the potential developed across the ends of said winding to determine which one of said switches will b actuated.

7. Static electrical code translating apparatus, as claimed in claim 1, and in which a code comprises three digits on a decimal basis and said signals denoting said one part of the code comprise a signal denoting a first one of said three digits and a signal denoting a group of values of a second one of said three digits and the other part of the code comprises a signal denoting a third one of said three digits and a signal denoting another group of values of said second one of said three digits.

8. Static electrical code translating apparatus, as claimed in claim 2, in which the means for applying a potential of a predetermined polarity to the terminal from the voltage induced in the secondary winding comprises a full wave bridge rectifier.

9. Static electrical code translating apparatus, as claimed in claim 3, in which the rectifier network comprises a source of D. C. potential, rectifiers in series with each of the control circuits and rectifiers between each of the ends of the secondary winding and said source of D. C. potential.

References Cited in the file of this patent
UNITED STATES PATENTS 2,675,426    Vroom _____ April 13, 1954